United States Patent
Nag et al.

(10) Patent No.: US 11,803,797 B2
(45) Date of Patent: *Oct. 31, 2023

(54) MACHINE LEARNING MODEL TO IDENTIFY AND PREDICT HEALTH AND SAFETY RISKS IN ELECTRONIC COMMUNICATIONS

(71) Applicant: ORACLE INTERNATIONAL CORPORATION, Redwood Shores, CA (US)

(72) Inventors: Ria Nag, Kolkata (IN); Padmakumar Nambiar, Bangalore (IN); Suvendu Praharaj, Bangalore (IN); Karthik Venkatasubramanian, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/512,150

(22) Filed: Oct. 27, 2021

(65) Prior Publication Data

US 2022/0083933 A1 Mar. 17, 2022

Related U.S. Application Data

(63) Continuation-in-part of application No. 17/018,297, filed on Sep. 11, 2020, now Pat. No. 11,481,734.
(Continued)

(51) Int. Cl.
*G06Q 10/0635* (2023.01)
*G06Q 10/107* (2023.01)
(Continued)

(52) U.S. Cl.
CPC ..... *G06Q 10/0635* (2013.01); *G06F 18/2433* (2023.01); *G06F 40/284* (2020.01); *G06N 20/20* (2019.01); *G06Q 10/107* (2013.01)

(58) Field of Classification Search
CPC ...... G06Q 10/107; G06N 20/00; G06N 20/10; G06F 17/18; G06K 9/6267
See application file for complete search history.

(56) References Cited

U.S. PATENT DOCUMENTS 8,620,842 B1 12/2013 Cormack
9,552,548 B1 * 1/2017 Brestoff ............... G06F 18/214
(Continued)

OTHER PUBLICATIONS

Python Software Foundation; Python Framework for Fast Vector Space Modelling; gensim 4.1.2—pip install gensim; pp. 1-4; released Sep. 16, 2021.
(Continued)

*Primary Examiner* — Nam T Tran
(74) *Attorney, Agent, or Firm* — Kraguljac Law Group, LLC

(57) ABSTRACT

Systems, methods, and other embodiments associated with a machine learning system that monitors and detects health and safety risks in electronic correspondence related to a target field are described. In one embodiment, a method includes monitoring email communications over a network to identify an email associated with a target field. A machine learning classifier is initiated that is configured to classify text from the email with a risk as being related to a safety risk or a non-risk. The machine learning classifier generates a probability risk value that the email is related to a safety risk and labels the email as safety risk or non-risk based at least in part on the probability risk value indicating that the email is a safety risk. An electronic notice is generated and transmitted to a remote device in response to the email being labeled as being safety risk to provide an alert.

21 Claims, 6 Drawing Sheets

Related U.S. Application Data

(60) Provisional application No. 63/245,029, filed on Sep. 16, 2021.

(51) Int. Cl.
  G06N 20/20 (2019.01)
  G06F 40/284 (2020.01)
  G06F 18/2433 (2023.01)

(56) References Cited

U.S. PATENT DOCUMENTS

| | | | |
|---|---|---|---|
| 9,760,850 | B1 | 9/2017 | Brestoff |
| 10,095,992 | B1 | 10/2018 | Brestoff et al. |
| 10,484,429 | B1 | 11/2019 | Fawcett et al. |
| 10,685,310 | B1 | 6/2020 | McCuiston et al. |
| 2004/0205661 | A1 | 10/2004 | Gallemore |
| 2005/0209897 | A1* | 9/2005 | Luhr .......... G06Q 30/0201 705/7.29 |
| 2013/0036478 | A1 | 2/2013 | Davis et al. |
| 2014/0337269 | A1 | 11/2014 | Eads |
| 2015/0195406 | A1 | 7/2015 | Dwyer et al. |
| 2016/0321582 | A1 | 11/2016 | Broudou et al. |
| 2018/0144421 | A1 | 5/2018 | Williams et al. |
| 2019/0019061 | A1* | 1/2019 | Trenholm .......... G06F 18/2411 |
| 2019/0213498 | A1 | 7/2019 | Adjaoute |
| 2020/0074242 | A1 | 3/2020 | Chen et al. |

OTHER PUBLICATIONS

Scikit-Learn Developers (BSD License); sklearn.linear_model. LogisticRegressionCV; pp. 1-6; 2207-2021; downloaded on Oct. 21, 2021 from: https://scikit-learn.org/stable/modules/generated/sklearn.linear_model.LogisticRegressionCV.html.

Tianqi Chen et al., PACKAGE 'xgboost';—Title: Extreme Gradient Boosting; version 1.4.1.1; Apr. 22, 2021; pp. 1-65; downloaded Oct. 21, 2021 from: https://cran.r-project.org/web/packages/xgboost/xgboost.pdf.

Akinosho et al.; Deep Learning in the Construction Industry; A review of Present Status and Future Innovations; Journal of Building Engineering, vol. 32; Nov. 2020, 101827; pp. 1-14; downloaded on Oct. 21, 2021 from: https://www.sciencedirect.com/science/article/pii/S2352710220334604#bib54.

Zhang et al.; A C-BiLSTM Approach to Classify Construction Accident Reports; pp. 1-16; published Aug. 20, 2020; Licensee MDPI, Basel, Switzerland; downloaded on Oct. 21, 2021 from: https://www.mdpi.com/2076-3417/10/17/5754/pdf.

Notice of Allowance from U.S. Appl. No. 17/307,163, filed May 4, 2021, dated Nov. 14, 2022, 14 pgs.

Gupta, et al.; Emotion Detection in Email Customer Care; pp. 10-16; Proceedings of NAACL HLT 2010 Workshop on Computational Approaches to Analysis and Generation of Emotion in Text; Jun. 2010; Assn. for Computational Linguistics, Los Angeles, CA.

Patent Cooperation Treaty (PCT), International Search Report and Written Opinion issued in PCT International Application No. PCT/US2022/043570, (International Filing Date: Sep. 15, 2022) dated Dec. 2, 2022 (16 pgs).

Tixier et al., Application of Machine Learning to Construction Injury Prediction; pp. 1-27; Jun. 2016, www.sciencedirect.com.

1st Non-Final Office Action from U.S. Appl. No. 17/018,297, filed Sep. 11, 2020, dated Nov. 24, 2021, 20 pgs.

Selivanov et al., PACKAGE 'TEXT2VEC', pp. 1-11, published Feb. 18, 2020; downloaded from: http://text2vec.org.

Alozn et al.; Can Machines Replace the Human Brain? A Review of Litigation Outcome Prediction Methods for Construction Disputes; pp. 1-8; Construction Law Intl. Conference, Mar. 2015.

Ullman; Stanford; Data Mining (Chapter 1) pp. 1-19; downloaded from: http://i.stanford.edu/~ullman/mmds/ch1.pdf.

Stacy Sinclair; Fenwick Elliott; AI and Contruction Law: an Essential and Inevitable Partnership; Part 2: Dispute Resolution and Predicting Dispute Outcomes; pp. 2-4; downloaded from: https://www.fenwickelliott.com/research-insight/newsletters/international-quarterly/ai-construction-law-2.

Bigham et al., (2019) Artificial Intelligence for Construction Safety: Mitigation of the Risk of Fall. In: Arai K., Kapoor S., Bhatia R. (eds) Intelligent Systems and Applications. IntelliSys 2018. Advances in Intelligent Systems and Computing, vol. 869. Springer, Cham. https://doi.org/10.1007/978-3-030-01057-7_76.

Arditi et al., Predicting the Outcome of Construction Litigation Using Boosted Decision Trees; Journal of Computing in Civil Engineering / vol. 19, Issue 4—Oct. 2005, pp. 1-7.

Mahfouz et al., Litigation Outcome Prediction of Differing Site Condition Disputes Through Machine Learning Models; Journal of Computing in Civil Engineering / vol. 26, Issue 3, May 2012; pp. 1-11.

Kakhki et al., Evaluating Machine Learning Performance in Predicting Injury Severity in Agribusiness Industries; ScienceDirect; Safety Science 117 (2019) pp. 257-262; downloaded on Oct. 21, 2021 from: https://www.sciencedirect.com/science/article/pii/S092575351831107X.

* cited by examiner

MACHINE LEARNING MODEL TO IDENTIFY AND PREDICT HEALTH AND SAFETY RISKS IN ELECTRONIC COMMUNICATIONS

CROSS REFERENCE TO RELATED APPLICATIONS

This disclosure claims the benefit of U.S. patent application Ser. No. 17/018,297 filed Sep. 11, 2020, titled "Machine Learning Model for Predicting Litigation Risk on Construction and Engineering Projects", by Venkatasubramanian, et al., which claims the benefit of U.S. Provisional Patent Application Ser. No. 62/900,086 filed Sep. 13, 2019, titled "Transforming Construction and Engineering Systems With Technology and Data Insights", by Venkatasubramanian, all assigned to the present assignee, and all of which are incorporated by reference herein in their entirety for all purposes.

BACKGROUND

Incidents leading to a health and safety risk are a common occurrence in most large-scale projects such as construction and engineering projects. These safety incidents cost owners, contractors, sub-contractors, architects, and consultants millions of dollars impacting the overall project. Early detection of potential issues may enable proactive interventions that could lead to avoiding accidents and safety breaches in a worksite.

For example, digital platforms are used to manage and communicate day-to-day electronic correspondences over the course of a project. These electronic correspondences contain information that if deciphered correctly could indicate early signs of potential issues that could lead to larger health and safety incidents. These early signs can be used to identify risks associated with each project and can serve to provide early warnings.

However, no prior system exists that is a computer intelligent system for identifying such early signs of risks for a project. Also, there is no prior system that can forecast or predict a potential risk for a project based on electronic correspondence.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement an artificial intelligence (AI) based monitoring and prediction/detection system. In one embodiment, a machine learning model is configured to monitor network communications and predict health and safety risk in electronic correspondences/communications exchanged that relate to a target field or project. In one embodiment, the target field is construction and engineering projects. For example, the present system and method identify potential health and safety risks using an application-specific artificial intelligence configured for semantic natural language understanding, created, trained and optimized specifically for health and safety risk detection in text from construction and engineering project correspondence.

As used herein, the term "health and safety risk" is also referred to as "safety risk" or "risk" for simplicity. "Safety risk" refers to a determination or classification that a correspondence or text/language relates to a potential health and safety risk.

The term "non-risk" refers to a determination or classification that a correspondence or text/language is not considered as (or does not relate to) a potential health and safety risk.

In one embodiment, the present system monitors (e.g., in near real-time) network communications and electronic correspondence in an ongoing project or a collection of projects in an organization's portfolio. Information in the electronic correspondence is deciphered with the machine learning model to identify and detect language indicating a safety risk. The machine learning model makes a prediction whether the language amounts to a threshold level of risk based on at least a set of trained data. When the risk is predicted for a correspondence, the system automatically generates an alert in near-real time and labels the associated correspondence threads as a safety risk. This may include labeling an email thread if there is a safety risk associated with the last correspondence sent in a single thread.

In one embodiment, the system may combine the identified correspondence with contextual project metadata to associate the predicted risk with a project process. Information about the identified correspondence and the identified project may then be transmitted and/or presented on a graphical user interface and/or transmitted in an electronic message to a remote computer for a user to have access to the information in near real-time. In another embodiment, the present system provides a feed-back process where the user can change the labels associated with each communication thread in case the prediction by the system is incorrect as judged based on the user's experience and intuition. The changed label is then fed back to the present system model as new training data to improve the prediction accuracy over time.

Figure 1:
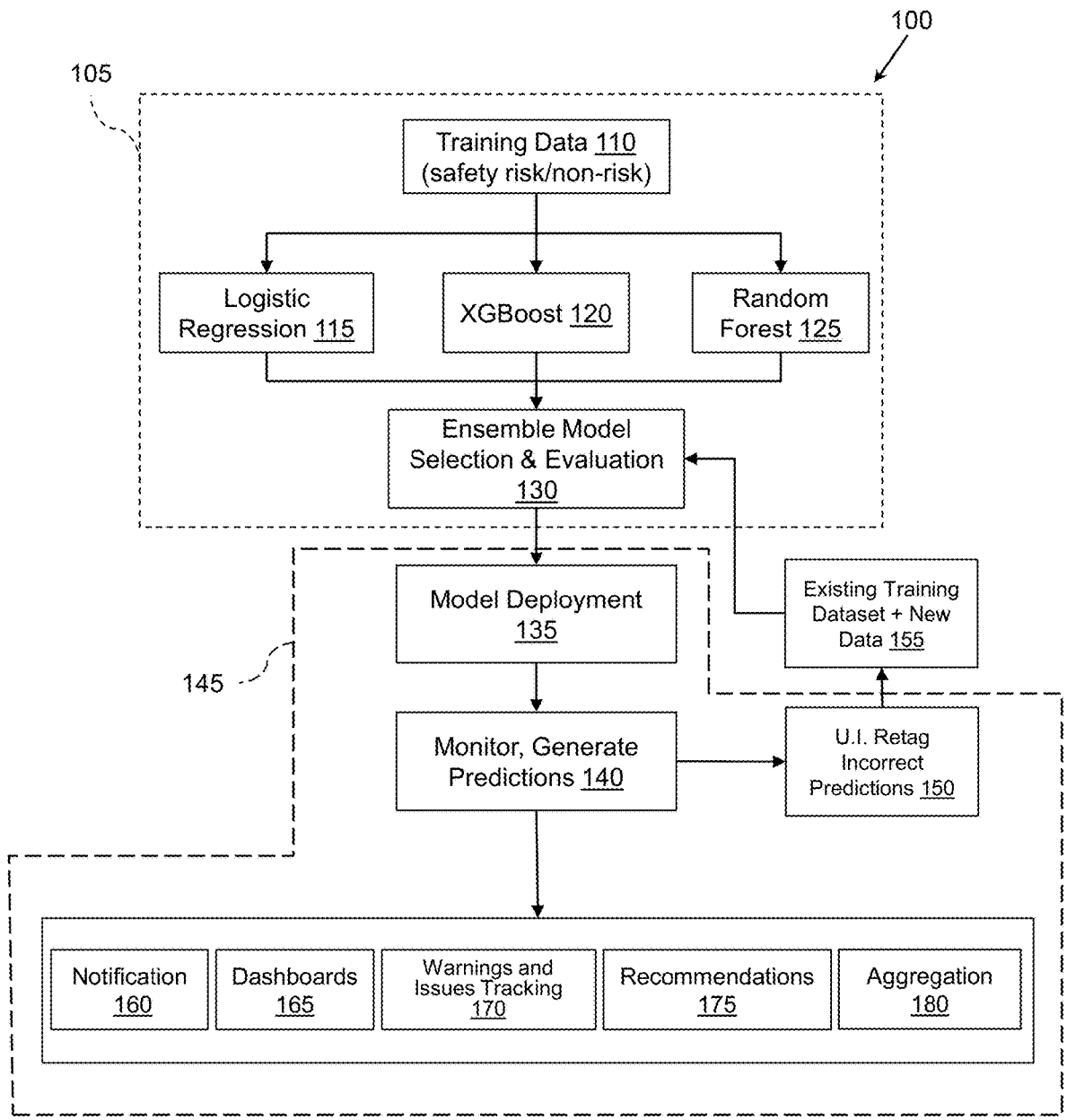
FIG. 1 illustrates one embodiment of a machine learning system associated with predicting risk from electronic correspondence.

With reference to FIG. 1, one embodiment of a safety risk detection system 100 is illustrated that is configured to monitor network communications and predict safety risk in electronic correspondences. Initially, the system 100 includes training a machine learning model (described below) with a known dataset of project correspondence including known safety risk language and known non-risk language. The training configures the machine learning model to identify and predict safety risks associated with a particular project based on electronic correspondence that is monitored.

In one embodiment, after the model is deployed and operating to monitor communications, any identified health and safety risks are categorized based on a likelihood the identified risk will result in a health or safety incident/event. The identified risks and associated correspondence may be presented and displayed for validation to allow correction of any incorrect predictions. Any corrected predictions are then fed back into the machine learning model to learn from the corrected predictions. This allows the system to evolve over time to identify safety risks based on the monitored communications and allow the system to associate the safety risk to a particular construction project. A more detailed explanation follows.

Training Phase

With reference to FIG. 1, components of an initial training phase are shown within the dashed line 105. In one embodiment, training data 110 is input to the machine learning model, which includes multiple, independently operating, base machine learning classifiers/algorithms. Each classifier generates an output that classifies a correspondence that is evaluated and all the outputs are combined in to create an ensemble majority voting classifier 130.

In FIG. 1, the risk detection system 100 includes an odd number (three) machine learning models/classifiers/algorithms 115, 120, and 125. In other embodiments, a different number of base classifiers may be used. In one embodiment, each base classifier is selected based on operating from a different theoretical background from the other classifiers to avoid bias and redundancy. For example, the three classifiers shown include (1) a logistic regression classifier 115 with L1 regularization, which is a parametric classifier; (2) a gradient boosting classifier XGBoost 120, which uses the Gradient Boosting framework; (3) a random forest classifier 125, which is an ensemble learning method that operates by constructing a multitude of decision trees and implements machine learning algorithms under the bootstrap aggregation framework.

The training data 110 is input to each of the machine learning classifiers 115, 120, and 125. For example, the training data includes a known dataset of construction project correspondence including known safety risk text/language and known non-risk language. The known safety risk text/language includes text, language, and/or phrases that are known to relate to health and safety issues and/or events.

Structure of the Classification Problem

A labeled dataset of over 40,000 health and safety risk related text dataset and about 6,000 non-risk related text dataset was prepared and used for testing and training the machine learning models/classifiers 115, 120, and 125. Being labeled refers a correspondence being classified and known to have text that is either a health and safety risk or is a non-safety risk. This training dataset was split into 90% 'train' and 10% 'test' dataset. In one embodiment, a ratio of risk samples versus non-risk samples was the same in both the test and the training dataset. Of course, different ratios may be used and different amounts of samples may be used. The risk-associated samples included text data from correspondences from different construction projects as well as from health and safety risk associated injury reports obtained from the Occupational Safety and Health Administration (OSHA) website. The non-risk samples also included text data from correspondences from different constructions projects but without any health and safety risk associated with them.

Figure 2:
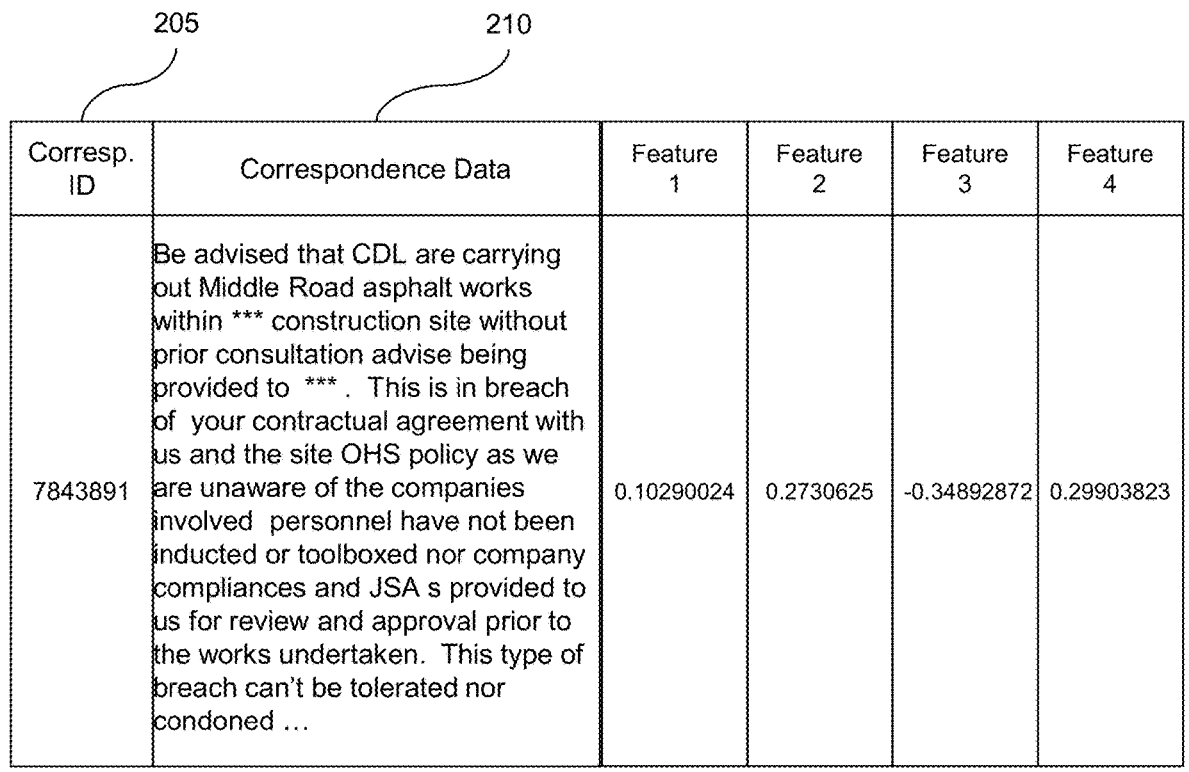
FIG. 2 illustrates one embodiment of a document vector matrix in Python for a single correspondence thread with 4 features.

In one embodiment, the correspondence text from each record was cleaned by removal of stop words, punctuations, numbers and HTML tags and all words were stemmed to their root word with all lowercase characters. Each correspondence was vectorized using a model that represents each document as a vector. For example, each correspondence was vectorized to a vector size of a selected number of features (e.g., thousands of features) using Gensim's Doc2Vec in Python to a document vector matrix in which each row represents a unique correspondence thread and each column represents a feature in the vector space. A simplified example of a document vector matrix is shown in FIG. 2.

Each feature was normalized to its mean value of 0 and a standard deviation of 1. The dataset was split into 90% for training and 10% for testing. After the regularization of the models, predictions were made on the test dataset of 10,000 records previously unseen by the machine learning models to determine their accuracy in prediction.

It is observed a number of observation's pairs $(x_i, y_i)$ i=1, ..., n where $x \in X \subset \mathbb{R}^p$ and $y \in Y = \{$Health and Safety Risk correspondence, Non-Risk correspondences$\}$. X is a predictor space (or attributes) and Y is a response space (or class).

In this case, the number of attributes is the features of the vectors obtained upon vectorization of each correspondence thread text. In one embodiment, a pre-trained vectorization model uses Gensim's Doc2Vec library for document/text vectorization, topic modeling, word embeddings, and similarities. Text2vec may also be used. The first step is to vectorize text using vocabulary based vectorization. Here unique terms are collected from a group of input documents (e.g., groups of email correspondence and threads) and each term is marked with a unique ID. For example, this may be performed using the create_vocabulary( ) function that identifies and collects unique terms and collects statistics for the terms.

Then the risk detection system 100 creates a vocabulary based document term matrix (DTM) using the pre-trained vectorization model Doc2Vec. This process transforms each correspondence thread (e.g., email thread or single email correspondence) into a numerical representation of the correspondence in the vector space, which is also called text embedding.

This text embedding process transforms text into a numerical representation (an embedding) of the text's semantic meaning. If two words or documents have a similar embedding, they are semantically similar. Thus, using the numerical representation, the risk detection system 100 is capable of capturing the context of a word in a document, semantic and syntactic similarity, relation with other words, etc.

In one embodiment, the entire dataset is transformed into an [M×N] matrix (see Table 1) with M being the number of correspondence threads and N is the total number of features in the vector space. Each correspondence thread is represented by a vector of N dimensions. As seen in Table 1, each row represents a unique correspondence thread (Doc1, Doc2, Doc3 . . . ) and each column represents a feature or term (T1, T2, T3 . . . ) of unique terms/attributes that exist in the document set. The feature sets shown in Table 1 for eight (8) features is for representation only. The value shown in each column is the frequency of the term occurring in the collection of documents in the vector space (e.g., term T1 occurs twice in Doc1). Each row is a vector corresponding to the associated Doc representing the frequency of each term. Some data sets may have thousands of terms, which may be a large processing task to train a machine learning model. In one embodiment, the vectors may be filtered based on features.

Table 1 shows an example document term matrix:

TABLE 1

Example Document Term Matrix

|  | T1 | T2 | T3 | T4 | T5 | T6 | T7 | T8 |
|---|---|---|---|---|---|---|---|---|
| Doc1 | 2 | 0 | 4 | 3 | 0 | 1 | 0 | 2 |
| Doc2 | 0 | 2 | 4 | 0 | 2 | 3 | 0 | 0 |
| Doc3 | 4 | 0 | 1 | 3 | 0 | 1 | 0 | 1 |
| Doc4 | 0 | 1 | 0 | 2 | 0 | 0 | 1 | 0 |
| Doc5 | 0 | 0 | 2 | 0 | 0 | 4 | 0 | 0 |
| Doc6 | 1 | 1 | 0 | 2 | 0 | 1 | 1 | 3 |
| Doc7 | 2 | 1 | 3 | 4 | 0 | 2 | 0 | 2 |

In another embodiment, the text embedding process transforms the text into a numerical representation (an embedding) into a document vector matrix rather than a document term matrix. With reference to FIG. 2, an example is shown of a document vector matrix for a single mail correspondence thread with four (4) features. In FIG. 2, the matrix is a matrix of document vectors or embeddings where each row represents the vector representation of a unique correspondence thread in the vector space. For example, a feature is some property of a document besides a term and its associated numeric representation as created from the vectorization process. As stated above, the numerical representation is a text's semantic meaning. As stated previously, a thread may have hundreds or thousands of features (e.g., 7000 features). In one embodiment, the document vector matrix is obtained from the corpus of correspondences or text data records that are used in the sample dataset, using for example Doc2vec library in Python.

A correspondence ID 205 is assigned to each particular correspondence thread (data 210). The four (4) example features are listed as Feature 1; Feature 2; Feature 3; and Feature 4. Here each feature in vector space is a feature from the correspondence generated by the pre-trained vectorization model. The generic terms "Feature 1," "Feature 2," etc. are used for simplicity and for discussion purposes only. Labels for each of these features may also be generated by the model and do not have any physical significance in this discussion. The labels can instead be represented as other types of strings based on how the model is configured to generate such labels.

The objective is to use these observations in order to estimate the relationship between X and Y, thus predict X from Y. The relationship is denoted as a classification rule, $$h^j(X) = \arg\max P(y|X,\theta_j), j=1,\ldots,3 \quad \text{(Equation 1)}$$

where $P(.,.)$ is the probability distribution of the observed pairs, $\Theta$ is the parameter vector for each base classifier, and j is the number of the base classifiers. Since the risk detection system 100 implementation has three base classifiers 115, 120, and 125, there are three classification rules, one for each base classifier, hence j=3.

In FIG. 2, under the columns of Features 1-4, numbers −0.0155624, −0.0561929, etc. are shown. These numbers represent example values of each feature in a document vector (vectorized representation of each document).

Data Preparation

In one embodiment, a labeled dataset is created from a sample group of correspondences having known safety risk text (e.g., correspondences identified with known text or phrases that relate to a health and safety issue) and a sample group of correspondences having known non-risk text (e.g., correspondences identified as having no known text or phrases that relate to a health and safety issue). For example, the labeled dataset may include about a thousand unique records of correspondence threads created from about a 50%-50% ratio of known safety risk correspondences (having known safety risk text) and non-risk correspondences. Of course, different amounts of data records may be used in the dataset.

In addition to having known safety risk text and known non-risk text, the correspondence from the dataset may include known construction and/or engineering vocabulary and terminology. For example, the construction terminology can be collected and input from an existing glossary or database of construction project terms. This allows the machine learning models to learn and identify whether a received email correspondence relates to a construction project or is unrelated to a construction project. This feature may be useful when the present system operates on a general email system that includes non-construction correspondence that should be filtered out to avoid unnecessary classification and use of computing resources (e.g., avoid using the machine classifiers, avoid processor time, memory, etc.).

In another embodiment, the system may be trained to identify and target a different type of correspondence instead of construction and engineering. The correspondence from the dataset may include known vocabulary and terminology from a different target field such as aviation, shipping, transportation, or other selected target field. This allows the machine learning models to learn and identify whether a received email correspondence relates to the target field or is unrelated. In one embodiment, when an email/correspondence is determined to be unrelated to the target field, the email/correspondence may be filtered or otherwise not subjected to further analysis.

The correspondence text from each record is cleaned by removal of stop words, punctuations, numbers and HTML tags. Remaining words are stemmed to their root word with all lowercase characters.

A vocabulary was created from a sample set of correspondence threads (e.g., 500+ emails and/or threads), which defined known safety risk vocabulary and known non-risk vocabulary. The sample set included a sub-set of correspondences that were known to be discussing or referring to safety risk issues and thus included known safety risk vocabulary. Another sub-set of correspondence threads were known to not be discussing or referring to safety risk issues and thus had known non-risk vocabulary.

Examples of vocabulary for known health and safety risks may include "accidents", "fatal", "injury", "harm", "dangerous", "damage", "hazard", "unsafe", "negligence", etc. Examples of vocabulary for known non health and safety risk may include "contract", "document", "supplies", "employee", "road", "building", etc. In one embodiment, the sample set contained the same or about the same ratio of safety risk correspondence samples and non-risk samples, but other ratios could be used (e.g., 60% risk to 40% non-risk). The ratio is not relevant as long as a sufficient sample set is used to train the machine learning model to accurately identify and classify between a safety risk correspondence and a non-risk correspondence at least to a defined threshold level. In the present example, the sample set of correspondence was also based on the target field, which is construction and engineering. Thus, the sample set of correspondences included a combination of construction/engineering vocabulary and safety risk/non-risk vocabulary. Each of the sample correspondence threads was then vectorized to create a document vector matrix (see FIG. 2) using the Doc2Vec library (or other vectorization function), in which each row represents a unique correspondence thread and each column represents a feature in the vector space.

In one embodiment, each feature was normalized to its mean value of 0 and a standard deviation of 1. The dataset was split into 90% for training and 10% for testing. The ratio of safety risk versus non-risk correspondences was the same (or nearly the same) in both the test and the training dataset. The training dataset was fed as an input to the below-mentioned machine learning models. After the regularization of the models, a prediction was made on the test dataset as well as a dataset of previously unseen records (e.g., 10,000 previously unseen records with unknown text). Any records predicted as non-risk by all three of the models were added back to the initial labeled dataset records as a co-training dataset to increase the size of the labeled train and test dataset for building the models.

With continued reference to FIG. 1, the following includes descriptions of the machine learning algorithms for each of the machine learning models:

logistic regression 115, XGBoost 120, and Random forest 125.

Machine Learning Models/Algorithms

1. Logistic Regression Model 115 with L1 Regularization

Input for the logistic regression model 115 is a scaled document term matrix created by the risk detection system 100 as described above [Table 1 and FIG. 2]. A penalized logistic regression model 115 with L1 regularization was built which imposes a penalty to the logistic model for having too many variables. The coefficients of some less contributive variables are forced to be exactly zero in Lasso Regression. In one embodiment, only the most significant variables are kept in the final model.

In logistic regression, the C parameter describes the inverse of regularization strength. In the present model, the C parameter is found to be optimum at a value of 50. A 10 fold cross validation was performed. Maximum number of iterations taken for the solvers to converge was set at 1000 and the tolerance for the optimization was taken as 1e-4.

Figure 3:
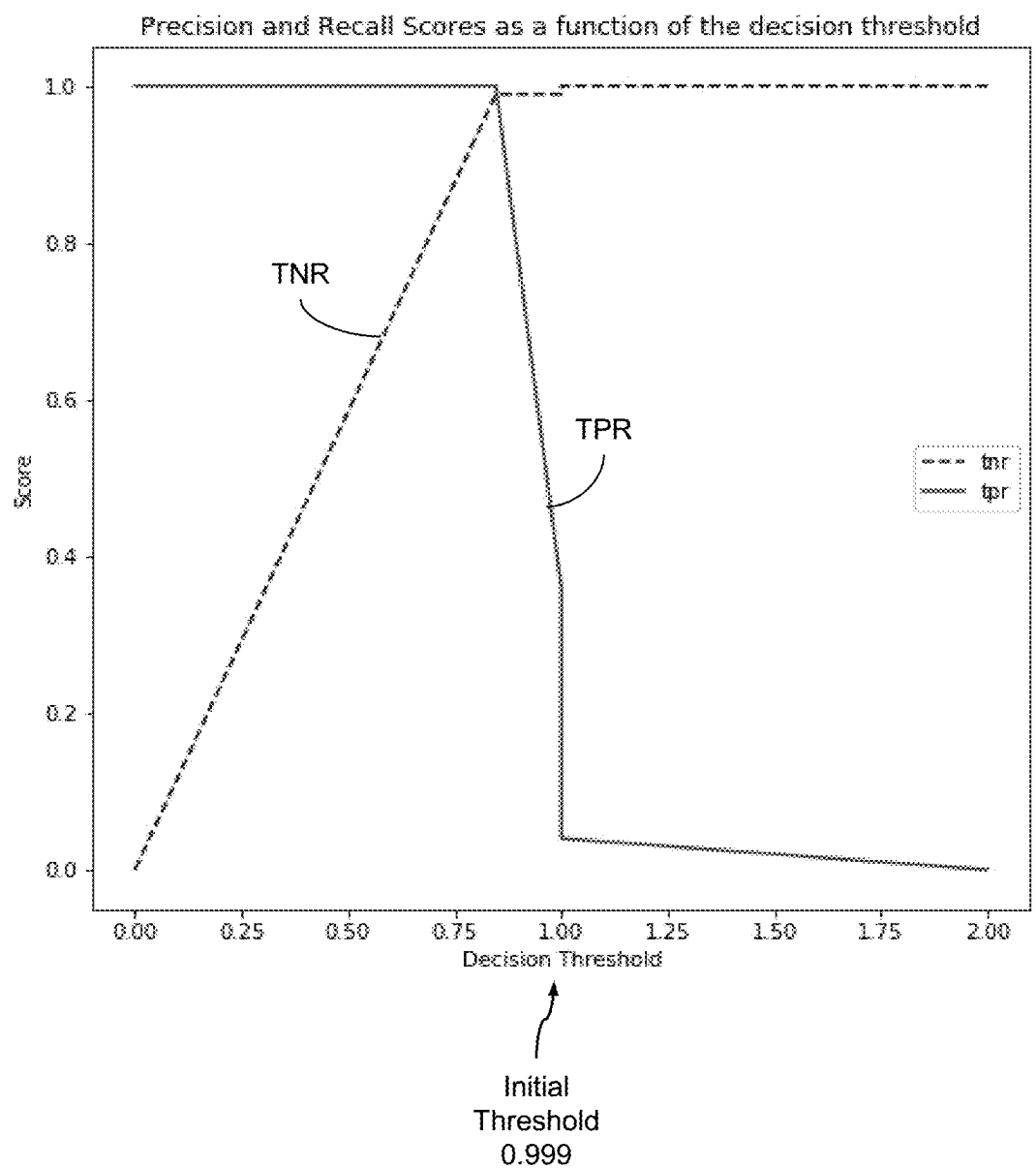
FIG. 3 illustrates one embodiment of a graph showing Sensitivity (tpr) and Specificity (tnr) versus probability of safety risk cutoff value graph for choosing an initial threshold.

The output of the logistic regression model 115 is a probability risk value of a correspondence thread to be a health and safety risk. An initial threshold for the probability risk value of the correspondence thread to be a safety risk was taken to be any value above 0.999. The initial threshold was chosen to be the cutoff value for probability where the sensitivity, specificity, and accuracy are very close to each other using a grid search (see FIG. 3 showing Sensitivity (TPR—true positive rate) and Specificity (TNR—true negative rate) versus probability of safety risk cutoff value graph). The threshold was then slightly modified according to how the model performed across unseen datasets (unknown/unclassified datasets). The threshold may also be lowered to increase the number of correspondences that are classified as a safety risk. However, this may lower accuracy of the model by potentially increasing the number correspondences incorrectly classified as a safety risk.

Table 2 shows evaluation metrics on test data with Logistic Regression model:

| Accuracy | 0.979774 |
|---|---|
| Recall | 0.976750 |
| Precision | 1.000000 |
| roc_auc_score | 0.988375 |

The ROC-AUC score is an evaluation metric to assess the performance of a classification model. AUC is an "Area Under the ROC Curve." The AUC measures the entire two-dimensional area underneath the entire ROC curve from (0,0) to (1,1). The ROC curve stands for "Receiver Operating Characteristic" curve and is a graph showing the performance of a classification model at all classification thresholds. The ROC curve plots two parameters: True Positive Rate (TPR) and False Positive Rate (FPR), where the curve plots TPR vs. FPR at different classification thresholds.

2. Gradient Boosting Algorithm Ensemble Algorithm Using XGboost

Input for the XGBoost model 120 is the scaled document term matrix created by the system 100 as described above (e.g., FIG. 2, Table 1). XGBoost is an optimized distributed gradient boosting library designed to be highly efficient, flexible and portable. It implements machine learning algorithms under the Gradient Boosting framework. In the XGBoost model 120, it is implemented with a gradient boosting tree algorithm. The input matrix is the same document term matrix (document-feature matrix) as referred to above.

In tree-based ensemble methods, such as XGBoost or Random Forest, each feature is evaluated as a potential splitting feature, which makes them robust to unimportant/irrelevant variables, because such variables that cannot discriminate between events/non-events will not be selected as the splitting variable and hence will be very low on the variable importance graph as well.

The "AUC" under "ROC curve" was used as the evaluation metric. The number of trees was selected as 50 and the learning rate was selected as 0.2 for hyperparameter tuning for regularization after a grid search over a range of values. The threshold for the probability risk value of the correspondence thread to be a safety risk was taken to be any value above 0.999. The threshold value was chosen based on model performance across unseen datasets in the same way as was done for logistic regression model. The output of the XGBoost model 120 is a probability risk value of the correspondence thread to be a safety risk.

Table 3 shows evaluation metrics for XGBoost on the test data:

TABLE 3

| XGBoost Evaluation Metrics | |
|---|---|
| Accuracy | 0.993475 |
| Recall | 0.992500 |
| Precision | 1.000000 |
| roc_auc_score | 0.996250 |

3. Random Forest Classifier 125

The input for the random forest classifier model 125 is the scaled document term matrix (document-frequency matrix) as described above. In one embodiment, the random forest classifier 125 is built with four (4) variables available for splitting at each tree node selected through a grid search over a range of values.

The "AUC" under "ROC curve" was taken as the evaluation metric, and the number of trees was taken as 500. The number of features to consider when looking for the best split was taken to be 50 for hyperparameter tuning for regularization after a grid search over a range of values. The threshold for the probability risk value of the correspondence thread to be a safety risk was taken to be any value above 0.999. The threshold value was chosen based on model performance across unseen datasets in the same way as was done for logistic regression model. Output of the random forest classifier model 125 is the probability risk value of a correspondence thread to be a safety risk.

Table 4 shows evaluation metrics for the random forest classifier on the test data:

TABLE 4

Random Forest Evaluation Metrics

| Accuracy | 0.918008 |
|---|---|
| Recall | 0.905750 |
| Precision | 1.000000 |
| roc_auc_score | 0.952875 |

Ensemble Majority Voting Classification

With continued reference to FIG. 1, each of the three base classifiers 115, 120, and 125 is an expert in a different region of the predictor space because each classifier treats the attribute space under different theoretical basis. The risk detection system 100 combines output of the three classifiers 115, 120, and 125 in such a way to produce an ensemble majority voting classifier 130 that is superior to any of the individual classifiers and their rules. Thus with an odd number of three classifiers, a majority vote/prediction for a final result would need at least two classifiers to vote/predict the same result (e.g., either predict "safety risk" or "non-risk" for a correspondence).

In operations, as an electronic correspondence (e.g., mail thread) is evaluated by each model 115, 120, 125, the output of each model is a probability of the mail thread being a health and safety risk. Based on the probability compared to a threshold value, a label is assigned for each mail thread. For example, the label is "1" if the probability of a mail thread being a safety risk as predicted by the model is greater than the threshold value of probability of being a risk for that particular model. The label is "0" if the probability of a mail thread being a safety risk as predicted by the model is less than the threshold value of probability of being a risk for that particular model. Consequently, the label is "0" if the mail thread is of a non-risk nature (not a health and safety risk).

Of course, other labels may be used to indicate a safety risk or non-risk. In one embodiment, using ones "1" and zeros "0" as the labels allows the labels to be used as votes, which may then be combined from multiple machine learning classifiers to create a majority voting scheme of the ensemble model 130 as described below.

In one embodiment, the risk detection system 100 uses the following equation to combine the outputs from the three base classifiers into the ensemble model 130:

$$C(X)=h1(X)+h2(X)+h3(X) \quad \text{(Equation 2)}$$

Here C(X) is the sum of the weighted output of the three individual classifiers with h1(X), h2(X) and h3(X) being the output of the random forest 125, XGBoost gradient boosting 120, and the logistic regression classifier 115, respectively. Here C, h1, h2, and h3 are all functions of X, which represents the features or attributes identified from an electronic correspondence being evaluated. In another embodiment, one or more of the classifier outputs can be given a weighted value in equation 2 such as 2*H1(X).

In one embodiment, the system 100 classifies an electronic correspondence as a safety risk if C(X)>=2. If C(X) <2, the correspondence is classified as non-risk (not likely a health and safety risk). Thus, the ensemble model predicts a correspondence to be a safety risk if any two of the three base classifiers classifies the correspondence as a health and safety risk. In another embodiment, as an extension to this binary classification, each classifier may also classify each risk mail depending on their intensity/severity level of the risk into high level, medium level, and low level of risk.

Table 5 shows evaluation metrics for the Ensemble Model 130:

TABLE 5

Ensemble Model Evaluation Metrics

| Accuracy | 0.986733 |
|---|---|
| Recall | 0.984750 |
| Precision | 1.000000 |
| roc_auc_score | 0.992375 |

Model Deployment—Operation/Execution Phase

With continued reference to FIG. 1, in one embodiment, once the ensemble model 130 is configured and trained, the ensemble model 130 is deployed (block 135) for operation. During operation, correspondence is monitored and evaluated (block 140, also FIG. 4) in real-time or near-real time for having safety risk and non-risk content. The ensemble model 130 generates risk predictions for each correspondence based on its text as explained above and generates an associated label as a safety risk or non-risk. Components of the deployed model are shown in dashed line 145.

When the ensemble model 130 determines and predicts that a correspondence is a safety risk, an electronic notification (block 160) is generated via the graphical user interface (block 140). The deployment and operation of the ensemble model is further described with reference to FIG. 4.

In one embodiment, the ensemble model 130 in FIG. 1 may be configured to provide a number of additional features that are generated and presented in a graphical user interface. These features may include dashboards 165, warnings and issues tracking 179, recommendations 175 and/or aggregation 180.

For example, dashboards (block 165) may be generated to graphically represent one or more types of results and/or summary data from the ensemble model 130. For example, a summary may include a number of safety risk emails exchanged in a project visible to a particular organization/individual with the project within a specific interval of time. Other types of summary reports/information regarding the correspondences analyzed, statistics, and/or data analysis reports may be included in the dashboards 165 as graphical information. The display may also include whether each of the emails or correspondences displayed on the dashboard 165 has a safety risk content or not.

Warnings and issues tracking (block 170): In one embodiment, the system 100 highlights the topics and keywords that potentially point to the reason why the emails or correspondences have potential safety risk content as identified by the machine learning models. The warnings and issues tracking 170 may also be combined with recommendations 175.

Recommendations (block 175): In one embodiment, the system 100 may categorize a project as a high, medium or low risk category depending on a number of safety risk emails exchanged in a project visible to a particular organization/individual with the project within a specific interval of time. This will enable a concerned person to take appropriate measures as soon as possible.

Aggregation (block 180): In one embodiment, the system 100 may determine a percentage of safety risk emails among all mails exchanged in a project visible to a particular organization/individual with the project within a specific interval of time.

Figure 4:
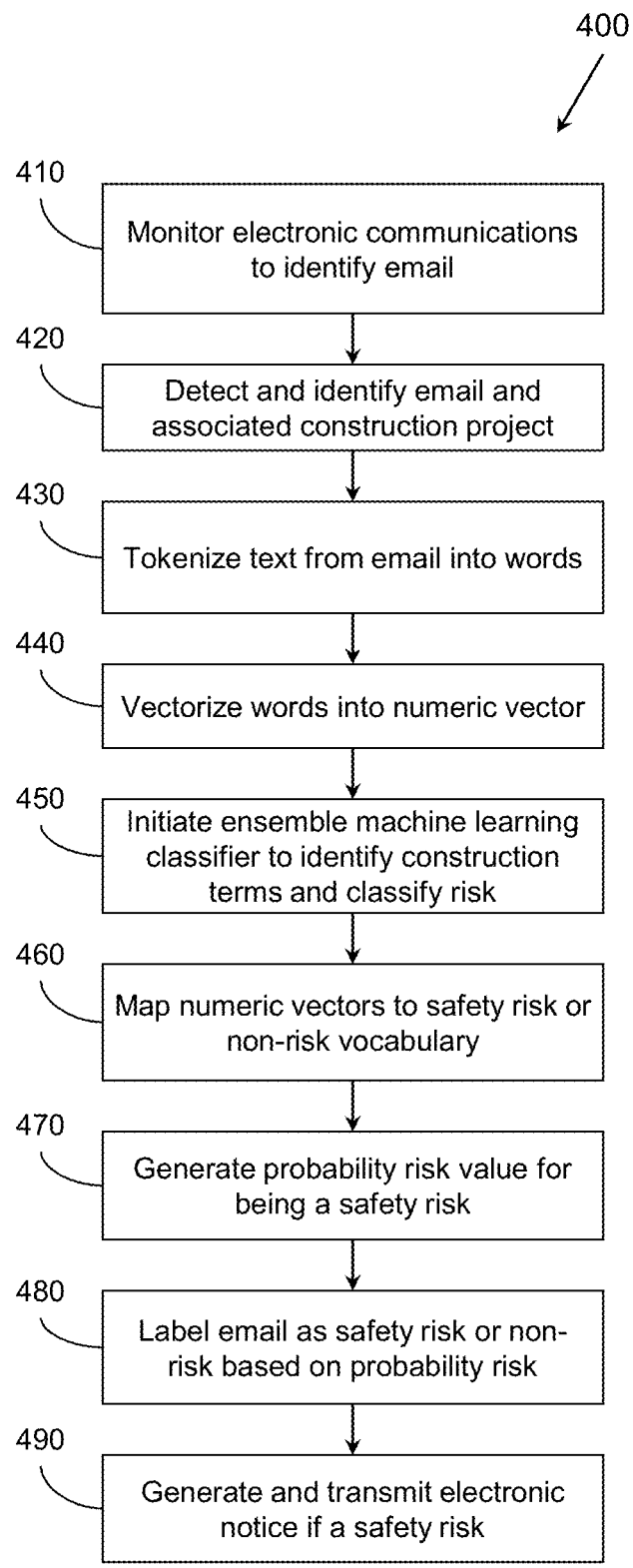
FIG. 4 illustrates an embodiment of a method associated with detecting potential risks from electronic communications of construction projects.

With reference to FIG. 4, one embodiment of a method 400 is illustrated that describes the operation of the ensemble model 130 during deployment and execution. As previously stated, the ensemble model 130 is configured to monitor electronic correspondence and detect safety risk from the electronic correspondence that is associated with a construction or engineering project. In one embodiment, the ensemble model 130 is configured as part of a selected computing platform and/or email network that receives the electronic correspondence to be monitored.

Overall, after the machine learning classifiers are built from the training dataset (as described under FIGS. 1-3), new incoming email correspondences are automatically passed through each classifier that is implemented. In the system of FIG. 1, three classifiers 115, 120, and 125 are included. After analysis of a correspondence, each classifier classifies/labels each of the incoming correspondences either as a safety risk or non-risk. In another embodiment, each classifier may also classify an identified risk with a level of risk severity/intensity of being a safety risk as low, medium, or high level. The ensemble model 130 may also continuously learn from user-feedback that helps to validate results, which is then fed back into the system for retraining. A more detailed explanation follows.

With reference to FIG. 4, once the method 400 is initiated and functioning on a targeted computing platform, at block 410, network communications are monitored to identify electronic correspondence received by the computing platform. For example, emails or other electronic correspondence are identified by an associated email system upon which the present system operates.

At 420, the system detects and identifies the email and its associated construction project. For example, the system 100 may have a list of identified projects and the system identifies which project the email belongs to. As previously explained, the machine learning models 115, 120, and 125 have been trained to identify construction and engineering vocabulary and terminology. This type of identification may assist to filter out emails or email threads that are not related to construction projects.

As another example, an organization may have one or more ongoing construction projects where each has a defined name and/or other metadata stored in the system that identifies each project. The system may parse and scan text from a received email and identify any known words or phrases that match an existing project ID and metadata. If found, the received email is associated with the existing project. Other ways of identification may include having a project ID in an email.

Each incoming email correspondence further passes through a number of functions for programmatically cleaning the correspondence. For example, at block 430, each email may be cleaned by removal of all non-Latin alphabet characters, html tags, punctuations, numbers and stop words. The email text may be tokenized by identifying and breaking down the correspondence text into words, punctuation marks, numeric digits, other objects in the text, etc. (block 430). If the email includes at least one word with greater than 4 letters, then each word in the email is stemmed to their root word.

At 440, the tokenized text words from the email are vectorized and feature scaled. In one embodiment, vectorizing the text includes converting each word into numbers, which are numeric vectors. Vectorization maps words or phrases from vocabulary to a corresponding vector of real numbers, which may be used to find word predications, word similarities and/or semantics. The vectors of numbers (i.e. features) are features and may be scaled by normalizing the range of features of data.

At 450, after cleaning the correspondence text and feature scaling, the ensemble machine learning classifier of FIG. 1 is initiated to identify construction terms and classify safety risk of the correspondence. The correspondence text is passed through each of the three machine learning classifiers 115, 120, and 125 of the system 100 (FIG. 1). Each classifier makes an individual prediction of whether the email text is a safety risk or non-risk based on the learned training data.

In one embodiment at block 460, the numeric vectors generated at block 440 are mapped to numeric vectors associated with the defined datasets of known safety risk vocabulary and known non-risk vocabulary (e.g., from the previously generated document term matrix (or document-vector matrix). In other words, the machine learning classifier processes the numeric vectors generated from the email correspondence by at least matching and comparing the numeric vectors to known numeric vectors that were generated from the set of defined safety risk vocabulary and the set of defined non-risk vocabulary.

At block 470, each of the three classifiers 115, 120, and 125 independently evaluates the correspondence and generates a prediction of a probability risk value for the correspondence being evaluated as previously described above. If the probability risk value exceeds the defined threshold value set for the associated classifier, then that classifier labels the correspondence as a safety risk (e.g., a label value of "1") or non-risk (e.g., label value of "0"). In general, the output label is viewed as a "vote" since the output is either a "1" (safety risk YES) or "0" (safety risk NO). The multiple "votes" generated by the multiple classifiers are then combined for a majority vote determination.

At block 480, the three labels/votes output by the three classifiers are then combined using the majority voting scheme (e.g., equation 2) as part of the ensemble model 130. Based on the combined labels, the email correspondence is given a final label by the system as a safety risk or non-risk based on the majority voting of the individual votes of the three classifiers. In another embodiment, a different number of classifiers may be used, and/or a selected classifier may have its output vote given a weighted value in equation 2 to avoid a tie in voting.

The ensemble classifier comprises an odd number of independent machine learning classifiers (three classifiers in the above embodiment). Each of the independent machine learning classifiers generates an output that classifies the email correspondence as being safety risk or non-risk. The output from each of the independent machine learning classifiers are all combined based at least in part on the majority vote scheme to generate the final label for the email as being safety risk or non-risk.

At block 490, the system is configured to generate an electronic notice in response to the final label indicating that the correspondence is a safety risk. In one embodiment, the electronic notice includes data that identifies the correspondence, the associated construction project, and an alert message regarding the potential safety risk. The electronic notice may also include additional data such as the email sender and receiver. The electronic notice may highlight or visually distinguish the text from the email correspondence related to safety risk vocabulary as identified by the machine learning classifiers. The electronic notice is then transmitted to a remote device and/or displayed on a graphical user interface to allow a user to receive the notice and have access to the correspondence in near real time so that an action may be taken to address issues in the correspondence.

In another embodiment, the system transmits the electronic notice to a designated remote device (e.g., via address, cell phone number, or other device ID) including at least the identification of the email and the label that indicates the email as a safety risk or non-risk. In response to receiving the electronic notice, the remote device provides a user interface that displays the data from the electronic notice and allows input to validate the label and change the label if a user believes the label is incorrect. This may include viewing any identified suspicious text from the email correspondence to allow the user to determine if the text is safety risk or non-risk based on their judgment. The user interface allows the label to be selected and changed. In response to the label being changed via the user interface, the system may then transmit the changed label and corresponding email as feedback to the machine learning classifier to retrain the machine learning classifier. The validation mechanism is further described in the following section.

Validation and Continuous Learning

With reference again to FIG. 1, in one embodiment, the correspondence text for one or more predictions made by the ensemble model 130 may be made available to a user of the system 100. This provides a validation mechanism so that the user is able to apply human decision making to validate the prediction and the associated label (safety risk or non-risk). As part of the validation mechanism, the system 100 provides a feedback user interface 150 that allows a user to input corrections to retag or otherwise re-label selected correspondence as a safety risk or non-risk in case the user does not agree with the predictions and labels made by the ensemble model 130.

A continuously learning process is implemented to retrain the ensemble model 130 with the new feedback data that changes previous labels. The ensemble model 130 receives the label changes and other feedback data as input to be combined and retrained with the existing training dataset of classified data (block 155). This feedback data 155 is used to re-train the ensemble model 130 with the previous and newly labeled correspondence bodies. The retrained ensemble model 130 will replace the existing model if the retrained model outperforms the existing model. This may be based on executing a number of comparison tests to determine the model's accuracy in predictions. Using this feedback mechanism, the risk detection system 100 will learn to classify correspondences more accurately over a period of time.

Figure 5:
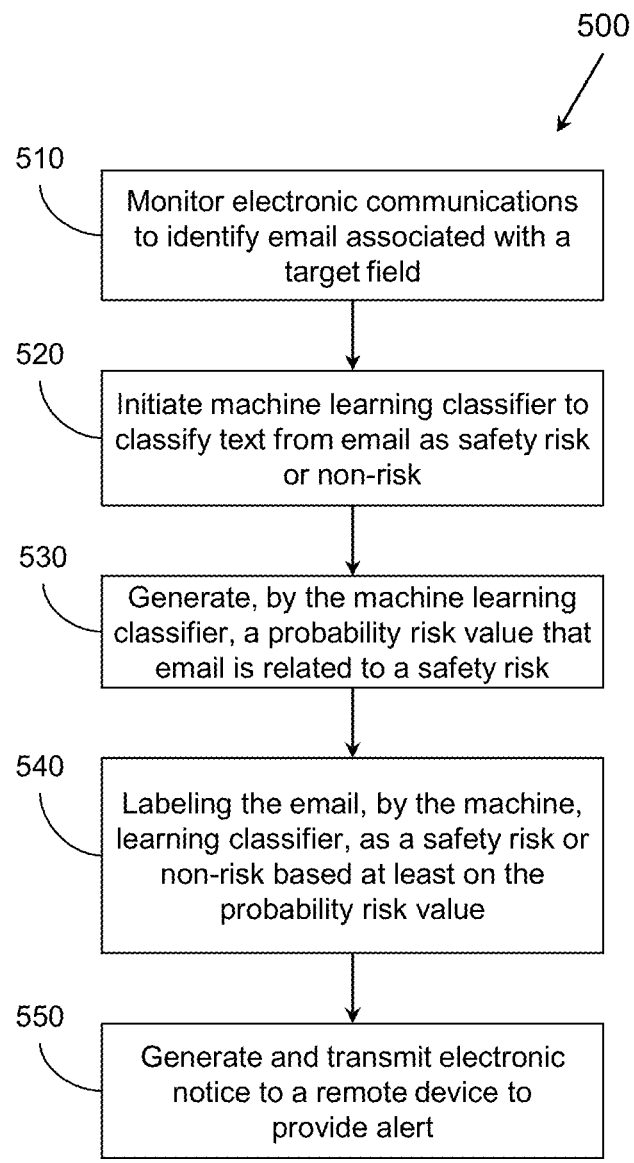
FIG. 5 illustrates another embodiment of a method associated with detecting potential safety risks from electronic communications of a target field.

With reference to FIG. 5, another embodiment of a method 500 is illustrated that describes the operation of the ensemble model 130 during deployment and execution. As previously stated, the ensemble model 130 (from FIG. 1) is configured to monitor electronic correspondence and detect safety risk from the electronic correspondence. In method 500, the ensemble model 130 is trained and configured to identify correspondence associated with a target field.

The target field may be a selected field or activity, for example, construction projects, aviation, shipping activities, warehouse projects, a product manufacturing projects, or other selected field or activity. In one embodiment, the ensemble model 130 is configured as part of a selected computing platform and/or email network that receives the electronic correspondence to be monitored for the target field. Thus, the ensemble model 130 from FIG. 1 is previously trained (as described under FIGS. 1-3) with vocabulary associated with the target field.

Overall, after the machine learning classifiers are trained, new incoming email correspondences being monitored are automatically passed through each classifier that is implemented. In the system of FIG. 1, three classifiers 115, 120, and 125 are included. After analysis of a correspondence, each classifier classifies/labels each of the incoming correspondences either as a safety risk or non-risk.

With continued reference to FIG. 5, once the method 500 is initiated and functioning on a targeted computing platform, at block 510, network communications are monitored to identify electronic correspondence received by the computing platform that is associated with the target field. For example, emails or other electronic correspondence are detected by an associated email system upon which the present system operates.

In one embodiment, each incoming email correspondence may be passed through a number of functions for programmatically cleaning the correspondence. For example, each email may be cleaned by removal of all non-Latin alphabet characters, html tags, punctuations, numbers and stop words. The email text may be tokenized by identifying and breaking down the correspondence text into words, punctuation marks, numeric digits, other objects in the text, etc. If the email includes at least one word with greater than 4 letters, then each word in the email may be stemmed to their root word. Based on the remaining terms in the correspondence, the system identifies whether the vocabulary matches the known vocabulary of the target field as previously described. This type of identification may assist to filter out emails or email threads that are not related to target field.

At block 520, the ensemble machine learning classifier of FIG. 1 is initiated to classify text from the email correspondence with a risk as being related to a safety risk or a non-risk. The correspondence text is passed through each of the three machine learning classifiers 115, 120, and 125 of the system 100 (FIG. 1). Each classifier makes an individual prediction of whether the email text is a safety risk or non-risk based on the learned training data.

At block 530, each of the three classifiers 115, 120, and 125 independently evaluates the correspondence and generates a prediction of a probability risk value for the correspondence being evaluated as previously described above. If the probability risk value exceeds the defined threshold value set for the associated classifier, then at block 540, that classifier labels the correspondence as a safety risk (e.g., a label value of "1") or non-risk (e.g., label value of "0"). In general, the output label is viewed as a "vote" since the output is either a "1" (safety risk YES) or "0" (safety risk NO), which is based at least in part on the probability risk value indicating that the email is a safety risk. The multiple "votes" generated by the multiple classifiers are then combined for a majority vote determination.

At block 540, the labels/votes output by the machine learning classifiers are then combined using the majority voting scheme (e.g., equation 2) as part of the ensemble model 130. Based on the combined labels, the email correspondence is given a final label by the system as a safety risk or non-risk based on the majority voting of the individual votes of the three classifiers. In another embodiment, a different number of classifiers may be used, and/or a selected classifier may have its output vote given a weighted value in equation 2 to avoid a tie in voting.

At block 550, the system generates an electronic notice in response to the final label indicating that the correspondence is a safety risk. In one embodiment, the electronic notice includes data that identifies the correspondence, an associated project (if determined), and an alert message regarding the potential safety risk. The electronic notice may also include additional data such as the email sender and receiver. The electronic notice may highlight or visually distinguish the text from the email correspondence related to safety risk vocabulary as identified by the machine learning classifiers. The electronic notice is then transmitted to a remote device and/or displayed on a graphical user interface to allow a user to receive the notice and have access to the correspondence in near real time so that an action may be taken to address issues in the correspondence.

In another embodiment, the system transmits the electronic notice to a designated remote device (e.g., via address, cell phone number, or other device ID) including at least the identification of the email and the label that indicates the email as a safety risk or non-risk. In another embodiment, the method 500 may perform one or more of the functions or sub-functions as described with reference to FIG. 4 and method 400.

In response to the final label indicating that the correspondence is a non-safety risk, the electronic notice may not be generated, and the system continues to process the next correspondence. The labeled non-risk correspondence may be transmitted to a remote device associated validation such as the validation mechanism described in FIG. 1, where someone may review the correspondence and confirm that the label is correct.

With the present system and method, email correspondence may be classified as a safety risk or non-risk in real time or near-real time. Such correspondences classified as a safety risk may indicate early signs of potential issues that could lead to larger health and safety incidents that could most likely have adverse or catastrophic impact on a project/asset under construction. Thus the present system enables an early action(s) to be taken to effectively mitigate this safety risk whenever it is proactively identified by the present system.

No action or function described or claimed herein is performed by the human mind. An interpretation that any action or function can be performed in the human mind is inconsistent and contrary to this disclosure.

Cloud or Enterprise Embodiments

In one embodiment, the safety risk detection system 100 is a computing/data processing system including an application or collection of distributed applications for enterprise organizations. The applications and safety risk detection system 100 may be configured to operate with or be implemented as a cloud-based networking system, a software as a service (SaaS) architecture, or other type of networked computing solution. In one embodiment the risk detection system is a centralized server-side application that provides at least the functions disclosed herein and that is accessed by many users via computing devices/terminals communicating with the risk detection system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 6:
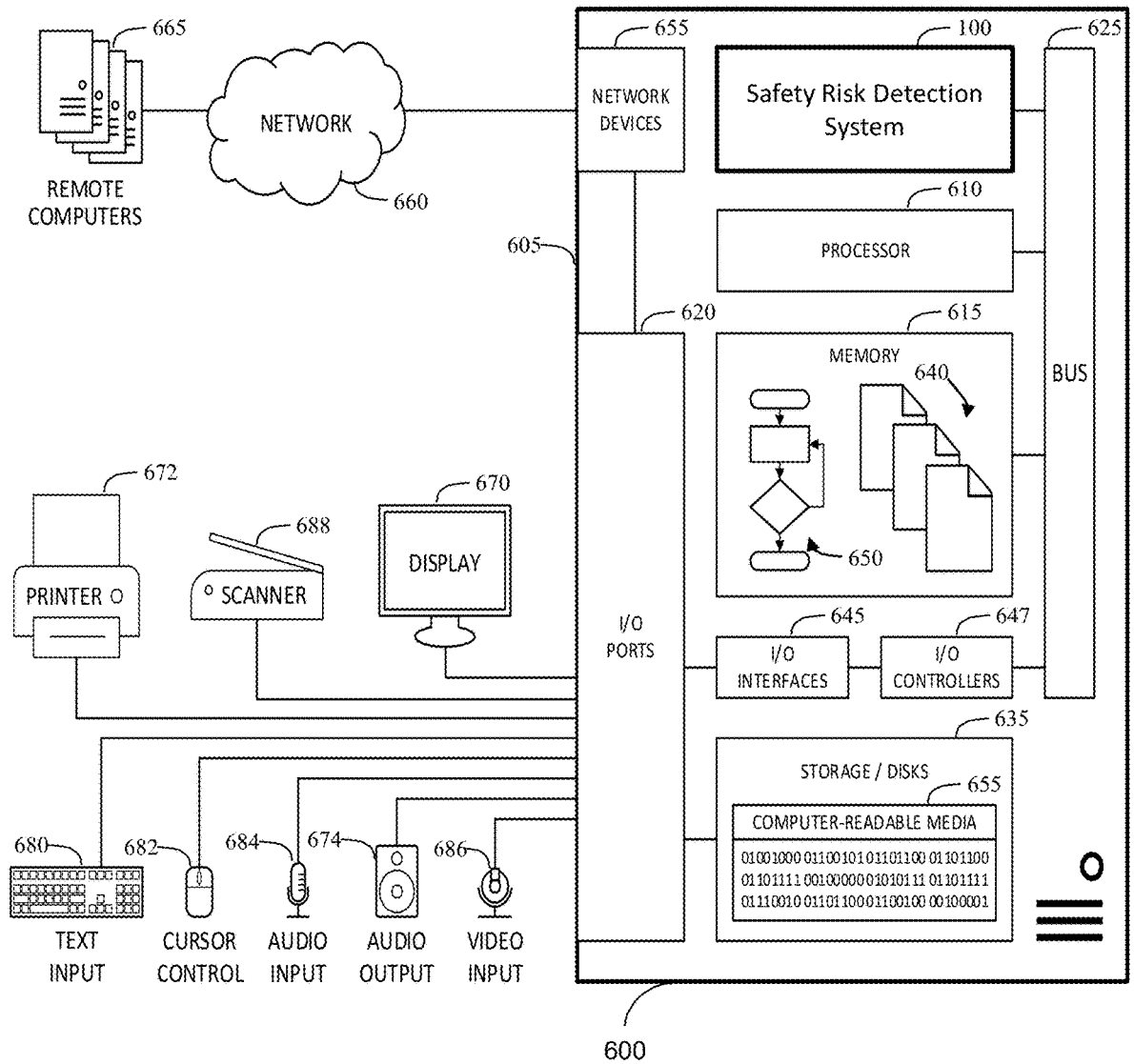
FIG. 6 illustrates an embodiment of a computing system configured with the example systems and/or methods disclosed.

In one embodiment, FIG. 6 illustrates a computing system 600 configured and/or programmed as a special purpose computing device with one or more components of the present safety risk prediction/detection system 100 and methods described herein, and/or equivalents.

The example computing system 600 may be a computer 605 that includes a hardware processor 610, a memory 615, and input/output ports 620 operably connected by a bus 625. In one example, the computer 605 is configured with the safety risk prediction/detection system 100 as shown and described with reference to FIGS. 1-4. In different examples, the safety risk prediction/detection system 100 may be implemented in hardware, a non-transitory computer-readable medium with stored instructions, firmware, and/or combinations thereof.

In one embodiment, risk prediction/detection system 100 and/or the computer 605 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The risk prediction/detection system 100 may also be implemented as stored computer executable instructions that are presented to computer 605 as data 640 that are temporarily stored in memory 615 and then executed by processor 610.

Generally describing an example configuration of the computer 605, the processor 610 may be a variety of various processors including dual microprocessor and other multiprocessor architectures. A memory 615 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 635 may be operably connected to the computer 605 via, for example, an input/output (I/O) interface (e.g., card, device) 645 and an input/output port 1020. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or a data 640, for example. The disk 635 and/or the memory 615 can store an operating system that controls and allocates resources of the computer 605.

The computer 605 may interact with input/output (I/O) devices via the I/O interfaces 645 and the input/output ports 620. The communications between the processor 610 and the I/O interfaces 645 and ports 620 are managed by an input/output controller 647. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665. Networks with which the computer 605 may interact include, but are not limited to, a LAN, a WAN, and other networks.

The computer 605 can send and receive information and signals from one or more output devices or input devices through I/O ports 620. The output devices include one or more displays 670, printers 672 (such as inkjet, laser, or 3D printers), and audio output devices 674 (such as speakers or headphones). The input devices include one or more text input devices 680 (such as keyboards), cursor controllers 682 (such as mice, touchpads, or touch screens), audio input devices 684 (such as microphones), video input devices 686 (such as video and still cameras), or other input devices, such as scanner 688. Input/output devices may further include the disk 635, the network devices 655, and so on. In some cases, the computer 605 can be controlled by information or signals generated or provided by input or output devices, such as by text input devices 680, cursor controllers 682, audio input devices 684, disk 635, and network devices 655.

Definitions and Other Embodiments

In another embodiment, the described methods and/or their equivalents may be implemented with computer executable instructions in a form of an executable application (stand-alone application or part of a bigger system). Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method performed by at least one computing device, the method comprising:
    training a machine learning classifier (i) to identify safety risk text with a first dataset of correspondences having known safety risk vocabulary that refers to health issues or safety issues, and (ii) to identify non-risk text with a second dataset of correspondences having known non-risk vocabulary that does not refer to health issues or safety issues;
    monitoring email communications over a network to identify an email;
    in response to receiving the email over the network, detecting and identifying the email as being associated with a construction project;
    tokenizing text from the email into a plurality of words;
    vectorizing each of the plurality of words into a numeric vector that maps each word to a numeric value;
    initiating the machine learning classifier to classify text with a risk as being a safety risk or a non-risk, and inputting the numeric vectors generated from the email into the machine learning classifier;
    wherein the machine learning classifier processes the numeric vectors from the email by at least corresponding the numeric vectors to a set of numeric vectors associated with the known safety risk vocabulary and a set of numeric vectors associated with the known non-risk vocabulary;
    generating a probability risk value, by the machine learning classifier, that the email includes text that is referring to or discussing a safety risk;
    labeling the email as a safety risk or non-risk based at least in part on the probability risk value that the email is a safety risk; and
    generating and transmitting an electronic notice to a remote device in response to the email being labeled as being a safety risk to provide an alert.

2. The method of claim 1,
    wherein the machine learning classifier includes an ensemble classifier comprising a plurality of independent machine learning classifiers; and
    wherein each of the independent machine learning classifiers are configured to identify construction terminology;
    the method further comprising:
    generating an output by each of the independent machine learning classifiers that classifies the email as being a safety risk or non-risk; and
    combining the output from each of the independent machine learning classifiers based at least in part on a majority vote to generate the label for the email as being a safety risk or non-risk.

3. The method of claim 1 further comprising:
    initiating a second machine learning classifier and a third machine learning classifier both configured to identify construction terminology and to classify text with a prediction as being a safety risk or a non-risk, where each machine learning classifier is implemented with a different theoretical background from each other to avoid bias and redundancy during classification;
    generating an individual prediction by each of the machine learning classifiers indicating whether the email is a safety risk or a non-risk to produce at least three individual predictions; and
    labelling the email as safety risk or non-risk based on a majority vote of the three individual predictions.

4. The method of claim 1, further comprising:
    generating the electronic notice to include identification of the email and the label that indicates the email as (i) the safety risk when the email is identified as referring to or discussing health or safety issues or (ii) the non-risk when the email is identified as not referring to or discussing health or safety issues;
    providing a user interface to allow input to validate the label and change the label; and
    in response to the label being changed via the user interface, feeding back the changed label and corresponding email to the machine learning classifier to retrain the machine learning classifier.

5. The method of claim 1 further comprising:
    inputting the construction terminology to the machine learning classifier from a glossary or database of construction project terms.

6. The method of claim 1 further comprising:
    training the machine learning classifier to identify safety risk text based at least in part on a first dataset of correspondences having known text associated with a safety risk and a second dataset of correspondences having known non-risk text.

7. The method of claim 1, wherein:
detecting and identify the email as being associated with the construction project by at least evaluating the text from the email in relation to a trained dataset of construction terminology implemented by the machine learning classifier.

8. A computing system, comprising:
at least one processor configured to execute instructions;
at least one memory operably connected to the at least one processor;
a machine learning classifier configured to identify construction terminology and to classify text with a risk as being safety risk or non-risk;
wherein the machine learning classifier is trained (i) to identify safety risk text with a first dataset of correspondences having known safety risk vocabulary that refers to health issues or safety issues, and (ii) to identify non-risk text with a second dataset of correspondences having known non-risk vocabulary that does not refer to health issues or safety issues;
a non-transitory computer-readable medium that includes stored thereon computer-executable instructions that when executed by the at least one processor of cause the computing device to:
monitor email communications over a network to identify an email transmitted;
in response to receiving the email over the network, detect and identify the email as being associated with a construction project;
tokenize text from the email into a plurality of words;
input the plurality of words generated from the email into the machine learning classifier;
wherein the machine learning classifier is configured to evaluate the plurality of words from the email by at least corresponding the plurality of words to a set of the known safety risk vocabulary and a set of the known non-risk vocabulary;
generate, by the machine learning classifier, a probability risk value that the email is safety risk based at least on evaluating the plurality of words from the email;
label the email as a safety risk or non-risk based at least in part on the probability risk value that the email is safety risk; and
generate and transmit an electronic notice to a remote device in response to the email being labeled as being safety risk to provide an alert in near-real time in relation to receiving the email over the network.

9. The computing system of claim 8, wherein the machine learning classifier includes an ensemble classifier comprising a plurality of independent machine learning classifiers;
wherein each of the independent machine learning classifiers is configured to identify construction terminology;
wherein each of the independent machine learning classifiers is configured to generate an output that classifies the email as being safety risk or non-risk; and
wherein ensemble classifier is configured to combine the output from each of the independent machine learning classifiers based at least in part on a majority vote to generate the label for the email as being safety risk or non-risk.

10. The computing system of claim 8, wherein machine learning classifier includes at least a first machine learning classifier, a second machine learning classifier and a third machine learning classifier;
wherein each of the machine learning classifiers are configured to identify construction terminology and to classify text with a prediction as being safety risk or non-risk;
where each machine learning classifier is implemented with a different theoretical background from each other to avoid bias and redundancy during classification,
where each of the machine learning classifiers is configured to generate an individual prediction of whether the email is safety risk or non-risk to produce at least three individual predictions; and
wherein the computing system is configured to label the email as a safety risk or non-risk based on a majority vote of the three individual predictions.

11. The computing system of claim 8, further comprising instructions that when executed by the at least one the processor cause the processor to:
transmit the electronic notice to the remote device including identification of the email and the label that indicates the email as safety risk or non-risk;
provide a user interface to allow input to validate the label and change the label; and
in response to the label being changed via the user interface, feed back the changed label and corresponding email to the machine learning classifier to retrain the machine learning classifier.

12. The computing system of claim 8, further comprising instructions that when executed by the at least one the processor cause the processor to:
input the construction terminology to the machine learning classifier from a glossary or database of construction project terms.

13. The computing system of claim 8, further comprising instructions that when executed by the at least one the processor cause the processor to:
train the machine learning classifier (i) to identify safety risk text with a first dataset of correspondences having known text that refers to health and safety issues, and (ii) to identify non-risk text with a second dataset of correspondences having known non-risk text that does not refer to health and safety issues.

14. A non-transitory computer-readable medium that includes stored thereon computer-executable instructions that when executed by at least a processor of a computer cause the computer to:
monitor email communications over a network to identify an email associated with a target field;
initiate a machine learning classifier configured to classify text from the email with a risk as being related to a safety risk or a non-risk;
wherein the machine learning classifier is trained (i) to identify safety risk text with a first dataset of correspondences having known text that refers to health and safety issues, and (ii) to identify non-risk text with a second dataset of correspondences having known non-risk text that does not refer to health and safety issues;
generate, by the machine learning classifier, a probability risk value that the email is related to a safety risk;
label, by the machine learning classifier, the email as safety risk or non-risk based at least in part on the probability risk value indicating that the email is a safety risk; and
generate and transmit an electronic notice to a remote device in response to the email being labeled as being safety risk to provide an alert.

15. The non-transitory computer-readable medium of claim 14, wherein the machine learning classifier includes an ensemble classifier comprising plurality of independent machine learning classifiers;
  wherein each of the independent machine learning classifiers are configured to identify terminology from the target field;
  wherein each of the independent machine learning classifiers generate an output that classifies the email as being a safety risk or non-risk; and
  wherein the output from each of the independent machine learning classifiers is combined based at least in part on a majority vote to generate the label for the email as being a safety risk or non-risk.

16. The non-transitory computer-readable medium of claim 14, further comprising instructions that when executed by at least the processor cause the processor to:
  initiate a second machine learning classifier and a third machine learning classifier both configured to identify terminology associated with the target field, and to classify text with a prediction as being a safety risk or non-risk, where each machine learning classifier is implemented with a different theoretical background from each other to avoid bias and redundancy during classification,
  where each of the machine learning classifiers generates an individual prediction of whether the email is a safety risk or non-risk to produce at least three individual predictions; and
  labelling the email as a safety risk or non-risk based on a majority vote of the three individual predictions.

17. The non-transitory computer-readable medium of claim 14, further comprising instructions that when executed by at least the processor cause the processor to:
  transmit the electronic notice to the remote device including identification of the email and the label that indicates the email as a safety risk or non-risk;
  provide a user interface to allow input to validate the label and change the label; and
  in response to the label being changed via the user interface, feeding back the changed label and corresponding email to the machine learning classifier to retrain the machine learning classifier.

18. The non-transitory computer-readable medium of claim 14, further comprising instructions that when executed by at least the processor cause the processor to:
  input construction terminology to the machine learning classifier from a glossary or database of construction project terms, wherein the target field is associated with construction.

19. The non-transitory computer-readable medium of claim 14, further comprising instructions that when executed by at least the processor cause the processor to:
  detect and identify the email as being associated with the target field by at least evaluating the text from the email in relation to a trained dataset of terminology implemented by the machine learning classifier;
  wherein the trained dataset of terminology is based on terminology associated with the target field.

20. A computer-implemented method performed by at least one computing device, the method comprising:
  monitoring email communications over a network to identify an email associated with a target field;
  initiating a machine learning classifier configured to classify text from the email with a risk as being related to a safety risk or a non-risk;
  wherein the machine learning classifier is trained (i) to identify safety risk text with a first dataset of correspondences having known text that refers to health issues or safety issues, and (ii) to identify non-risk text with a second dataset of correspondences having known non-risk text that does not refer to health issues or safety issues;
  generating, by the machine learning classifier, a probability risk value that the email is related to a safety risk;
  labeling, by the machine learning classifier, the email as a safety risk or a non-risk based at least in part on the probability risk value indicating whether the email is a safety risk; and
  generating and transmitting an electronic notice to a remote device in response to the email being labeled as being the safety risk to provide an alert.

21. A computing system, comprising:
  at least one processor configured to execute instructions;
  at least one memory operably connected to the at least one processor;
  a machine learning classifier configured to identify terminology associated with a target field and to classify text with a risk as being safety risk or non-risk;
  wherein the machine learning classifier is trained (i) to identify safety risk text with a first dataset of correspondences having known safety risk vocabulary that refers to health issues or safety issues, and (ii) to identify non-risk text with a second dataset of correspondences having known non-risk vocabulary that does not refer to health issues or safety issues;
  a non-transitory computer-readable medium that includes stored thereon computer-executable instructions that when executed by the at least one processor of cause the computing device to:
    monitor communications over a network to identify a communication associated with a target field;
    initiate the machine learning classifier configured to classify text from the communication with a risk as being related to a safety risk or a non-risk based at least on whether the communication includes text that is referring to or discussing a health issue or safety issue;
    generate, by the machine learning classifier, a probability risk value that the communication is related to a safety risk;
    label, by the machine learning classifier, the communication as a safety risk or as a non-risk based at least in part on the probability risk value; and
    generate and transmit an electronic notice to a remote device in response to the communication being labeled as being the safety risk to provide an alert.

* * * * *